United States Patent [19]

Kelsic et al.

[11] Patent Number: 5,023,736
[45] Date of Patent: Jun. 11, 1991

[54] MAGNETIC LATCH FOR DISK DRIVE ACTUATOR

[75] Inventors: Gary Kelsic; Jim Martinez, both of Longmont, Colo.

[73] Assignee: MiniScribe Corporation, Longmont, Colo.

[21] Appl. No.: 355,162

[22] Filed: May 22, 1989

[51] Int. Cl.$^5$ .............................................. G11B 5/54
[52] U.S. Cl. ..................................... 360/105; 360/106
[58] Field of Search ................................ 360/105–106

[56] References Cited

U.S. PATENT DOCUMENTS

| | | |
|---|---|---|
| 4,562,500 | 12/1985 | Bygdnes . |
| 4,594,627 | 6/1986 | Viskochil et al. . |
| 4,635,151 | 1/1987 | Hazebrouck . |
| 4,654,735 | 3/1987 | Izraelev et al. . |
| 4,660,120 | 4/1987 | Manzke et al. . |
| 4,692,829 | 9/1987 | Campbell . |
| 4,890,176 | 12/1989 | Casey ................................ 360/105 |

Primary Examiner—A. J. Heinz
Attorney, Agent, or Firm—Curtis, Morris & Safford

[57] ABSTRACT

A limit stop/latching assembly in a disk storage system includes a crash stop for limiting travel of the actuator carriage at a fixed stop position. The assembly has a carriage latch incorporated with the crash stop. A magnetic latch actuator plate extends from the actuator carriage and is movable with the actuator carriage in a path of travel of the actuator carriage to abut the stop position. The carriage latch has a magnet and a pair of magnetic pole pieces abutting the magnet wherein the distance between the pole pieces defines a first gap and the distance between the pole pieces and the latch actuator plate defines a second gap. The latch is moved between a latched position, wherein said pole pieces are in magnetic contact with the latch plate, and a free position, wherein the actuator carriage is pivoted such that the second gap is greater than the first gap whereby magnetic flux is channeled substantially through the first gap to enable the latch plate to move remote from the crash stop.

15 Claims, 4 Drawing Sheets

MAGNETIC LATCH FOR DISK DRIVE ACTUATOR

FIELD OF THE INVENTION

The present invention is generally directed to disk storage systems and more particularly is directed to a limit stop/latching assembly for holding an actuator carriage at a predetermined stop position.

BACKGROUND OF THE INVENTION

In a hard or floppy disk drive system, a read/write head is moved across a data storage disk so as to be positioned over a selected one of the large number of substantially circular, concentric tracks in which data is recorded and/or reproduced. The head is mounted on an actuator carriage so as to be positioned at the desired track. The actuator carriage may either move linearly along a radius of the disk to position the head, or it may be adapted for rotary travel around an axis to move the head radially across the disk surface between the innermost track and the outermost track.

In most hard disk drive systems, a plurality of disks are stacked on a spindle and a corresponding plurality of magnetic heads are used to read/or write on respective surfaces of the disks. The magnetic heads "fly" over the surfaces of the disk on an air cushion generated by the rapid rotation of the disks themselves. When power is turned off, the actuator carriage is driven to move the magnetic heads to data-free parking or landing zone on which they may rest without destroying information, which is recorded only in other areas of the disks. Typically, the actuator carriage brings the heads quickly to the parking zone in case of error or loss of power, and generally a crash stop is provided to limit further movement of the actuator carriage once it reaches its stop position in the parking zone. The crash stop is conventionally in the form of a spring which may or may not be preloaded. Given the relatively small size of this disk drive, for example to read and write on a 3½ inch disk, it is a significant part of the design of the disk drive to precisely position the actuator carriage at its stop position so as to minimize the area of the information-free parking zone, which is essentially wasted disk surface space since no information is recorded therein, while being certain that the heads will not be moved too far and off the flyable surface of the disk.

Once the actuator carriage has been moved to its rest position abutting the crash stop, it is frequently desirable to latch the actuator carriage, for example when the disk drive is being moved, so that the heads will not move from the parking zone. The latch itself has to fit and function within the strict design tolerances for the disk drive system. While it is known to use a solenoid to move the latch back and forth between the free and latched positions, it is undesirable to use the solenoid to actively hold the latch at either position, since this would require a constant current and therefore constant drain on a battery or other power source. Instead, it has been previously preferable to actuate the solenoid merely to move the latch between the two positions. However, the actuator carriage is heavy relative to the latch and will therefore exert some force on the latch when the disk drive is tilted or shaken during movement. Some conventional disk drive systems have therefore actively held the latch against the actuator carriage to latch the actuator, or have actively held the latch in the free position and used a spring to force the latch to the latched position and hold it there against the actuator. Each of these apparatus, such as a solenoid, spring or other mechanical elements, used to function as an actuator latch have proved, however, to be extremely expensive, or cumbersome to implement because of space or tolerance requirements of the disk drive assembly.

OBJECTS OF THE INVENTION

Therefore, it is an object of the present invention to provide a disk storage system which avoids the above-described difficulties of the prior art.

It is another object of the present invention to provide a disk storage system and a limit stop/latching apparatus therefor which surely latches the actuator carriage at a predetermined stop position.

It is still another object of the present invention to provide a rotary disk storage system and limit stop/latching apparatus therefor which is adapted to latch the actuator carriage at a precisely defined position.

It is yet another object of the present invention to provide a rotary disk storage system and limit stop/latching apparatus which has a magnetic latch which keeps an actuator at its inner diameter crash stop location when the disk drive is not being used.

It is a further object of this invention to provide a rotary disk storage system and limit stop/latching apparatus which has a magnetic latch which prevents movement of the heads across the disk during non-operating conditions (such as during shipment) and thus, prevents the magnetic heads and disks from being damaged.

It is yet a still further object of the present invention to provide a rotary disk storage system and limit stop/latching apparatus wherein the magnetic force of the magnetic latch exerted upon the crash stop mechanism, although sufficient to hold the actuator at its crash stop position, is easily overcome when the actuator is driven during normal operation.

These and other objects, aspects and features of the present invention will become apparent from the following detailed description of a preferred embodiment thereof taken in connection with the accompanying drawings, throughout which like reference numeral denote like elements and parts.

SUMMARY OF THE INVENTION

In accordance with an aspect of the present invention, the limit stop/latching assembly herein is utilized in a rotary disk storage system in which the actuator carriage is mounted for rotary travel in a plane. The actuator carriage pivots so as to position a read/write head at a desired track on a magnetic disk. A crash stop is provided which limits the maximum degree that the actuator can pivot. A latch/crash stop assembly physically abuts a latch fin extending from the end of the actuator when the actuator makes its maximum clockwise (or counterclockwise) rotation so as to limit the innermost track (or inner diameter) of head movement.

In accordance with one of the general objects of this invention, a magnetic latch is provided which keeps the actuator at its crash stop location when the disk drive is not being used. This prevents movement of the heads across the disk during non-operating conditions (such as during shipment) and, thus, prevents the heads and disks from being damaged. The magnetic latch is assembled within the crash stop and is comprised of a magnet having two magnetic pole pieces (such as magnetic steel) extending therefrom with a gap between the pole pieces. This magnetic assembly is directly supported and incorporated integrally into the crash stop assembly. When the actuator rotates to its crash stop position, the steel pole pieces contact the actuator latching plate or fin which is bonded to the actuator; and magnetic flux flows from the magnet through one pole piece, through the actuator latching plate and then returns to the magnet through the other pole piece. Sufficient magnetic attraction between the pole pieces and the actuator latching plate serve to latch the actuator latch fin to the crash stop at its inner diameter position.

The magnetic force between the pole pieces and the latch fin, although sufficient to hold the actuator at its crash stop position, is easily overcome when the actuator is driven during normal operation. In one example, the actuator is of the so-called rotary voice coil motor (VCM) type; and when current flows through the VCM, the actuator pivots with enough force to overcome the magnetic attraction between the pole pieces and the latch fin. When the actuator is pivoted a sufficient distance such that the distance d between the latch/crash stop assembly and the actuator latch plate is greater than the gap between the pole pieces, magnetic flux follows the circuit from the magnet across the gap through the other pole piece back to the magnet. Since the magnetic flux no longer links the actuator latch plate, there no longer is minimal magnetic attraction between the latch/crash stop assembly and the latch fin. Hence, the actuator is driven easily and freely as if the magnetic latch assembly was not ever present.

BRIEF DESCRIPTION OF THE DRAWINGS

The following detailed description, given by way of example but not intended to limit the invention solely to the specific embodiments described, may best be understood in conjunction with the accompanying drawings which.

DETAILED DESCRIPTION OF THE PREFERRED EMBODIMENT

Figure 1:
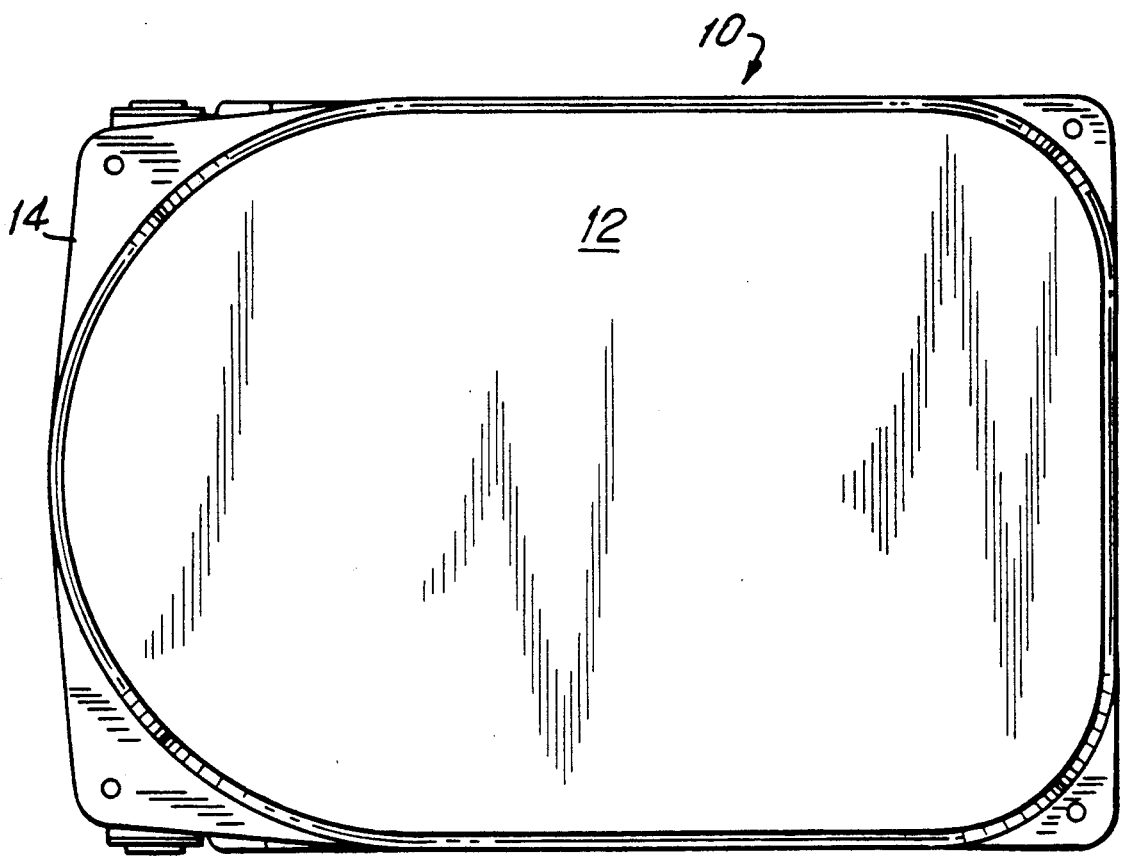
FIG. 1 is a top plan view of a preferred embodiment of apparatus in accordance with the present invention.

Referring now to the drawings and initially to FIGS. 1 and 2 thereof, the present invention will be described in the context of a hard disk drive system using a rotary head actuator carriage. It will be understood, however, that the present invention may also be applied to hard disk drive systems using linear head actuator carriages, as well as to floppy disk drive systems or other systems in which an actuator carriage may be moved to a stop position and latched thereat.

Figure 2:
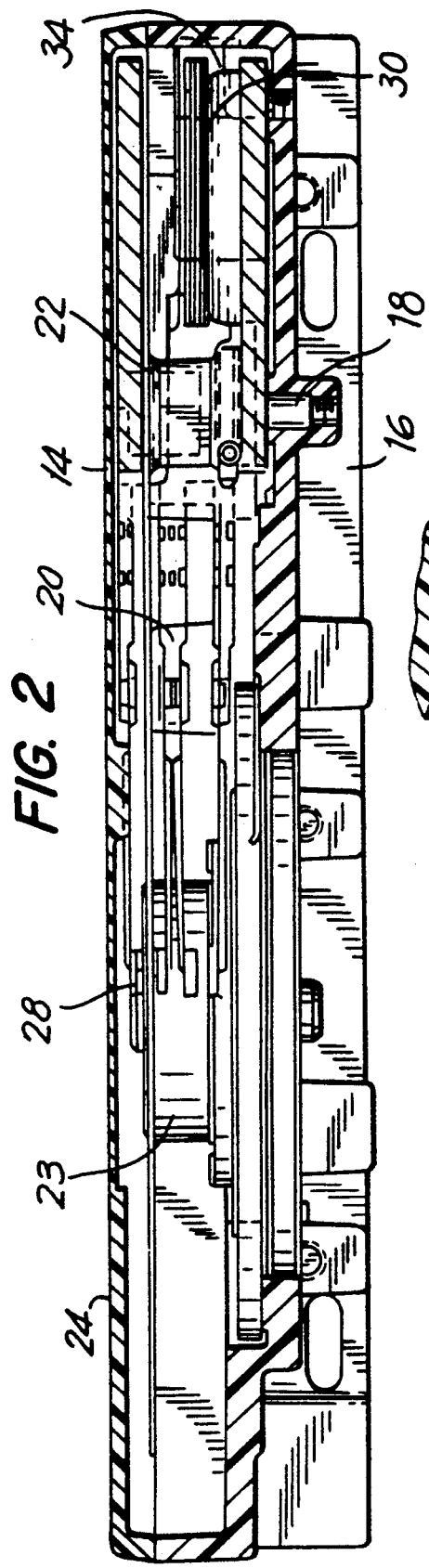
FIG. 2 is a side cross-sectional view of the apparatus taken along line 2—2 in FIG. 3.

As shown in FIG. 1, the hard disk drive system 10 has an outer envelope 12 in which the disks, actuator carriage and other elements are housed and supported between an upper plate 14 and a lower plate 16 (FIG. 2). Upper and lower plates 14 and 16 together define a box-like cavity in which the other elements are housed. Upper and lower plates 14, 16 are held together to provide dust-free environment for these elements within envelope 12. As shown in FIG. 2, one or more pins or spindles are mounted to lower plate 16 and upper plate 14 is mounted to the spindles by means of, for example, screws. In the illustrated embodiment, an actuator spindle 18 for pivotally mounting the head actuator carriage 20 is mounted on lower plate 16 and a first screw 22 is used to mount actuator carrier 20 to actuator spindle 18. In addition, a second, disk spindle 23 upon which at least one hard disk 24 is mounted is provided.

In the illustrated embodiment, one disk 24 is mounted on the same disk spindle and two heads 28 are supported by actuator carriage 20 for reading the upper and lower surface of the disk. Actuator carriage 20 is a rotary head actuator carriage mounted for rotary travel in a plane about spindle 18. As shown more clearly in FIG. 3, actuator carriage 20 is pivotable about actuator spindle 18 in either the clockwise or counterclockwise directions as shown by double headed arrow X. Mounted on actuator carriage 20 is an actuator motor 30, advantageously a voice coil motor, which may be driven to move actuator carriage 20 in the clockwise or counterclockwise directions to move heads 28 across the disk surfaces to overlie a selected one of the large number of substantially circular, concentric tracks on disk 24 in which data may be recorded and/or from which data may be read, from an innermost track T1 to an outermost track T2.

Actuator motor 30 is advantageously driven in response to an error condition or the termination of power to disk drive system 10 to move actuator carriage 20 to an extreme or "stop" position at either the inner or outer circumference of disk 24 over an information-free landing or parking zone 32 where no data is recorded. In the illustrated embodiment parking zone 32 is located at the inner circumference of disk 24, although it may be located at the outer circumference of disks 24 in other embodiments. As is conventional in hard disk drive systems, heads 28 normally "fly" over the surface of disks 24 on an air cushion created by the rapid rotation of disks 24 when disk drive system 10 is operative. Heads 28 come to rest against respective surfaces of disks 24 when disk drive system 10 is powered down either through the intentional termination of power or in response to a detected error condition. Parking zone 32 provides an area on which heads 28 may safely rest without destroying any information, since no information is recorded therein. However, the existence of parking zone 32 inherently reduces the area of the surfaces of disks 24 in which data may be recorded and so it is advantageous to minimize the area of parking zone 32.

Although an electronic braking circuit is conventionally provided to bring actuator carriage 20 to rest with heads 28 over parking zone 32 in response to error or power termination conditions, it may happen that the error conditions prevent the accurate functioning of the electronic braking circuit, and therefore a mechanical crash stop system is provided for physically preventing the pivoting of actuator carriage 20 beyond its stop position. Conventionally, this crash stop system includes a crash stop pin which is mounted on one of the upper or lower plates of disk drive system 10 and against which actuator carriage 20 impacts if it is driven up to and beyond the stop position. If the crash stop pin provides a decelerating force directly proportional to its deflection upon impact, it is termed a "non-preloaded" crash stop. If, however, the crash stop pin is biased to provide an immediate and substantial decelerating force upon impact, it is termed a "preloaded" crash stop. This preloading may be achieved, for example, by the provision of an elastomeric, springy surface on the crash stop pin, or may be provided by structuring the crash stop pin itself as a spring or the equivalent.

In the illustrated embodiment of the present invention, a crash stop 34 preferably in the form of a pin or a spring mounted on lower plate 16 at a predetermined position thereon. Crash stop pin 34 is preferably made of a non-magnetic material such as plastic and physically abuts an actuator latch plate 36, made preferably of magnetic steel, and bonded or otherwise attached to an end 37 of the actuator when the actuator makes its maximum clockwise rotation so as to limit the innermost track (or inner diameter) of head movement.

Figure 4:
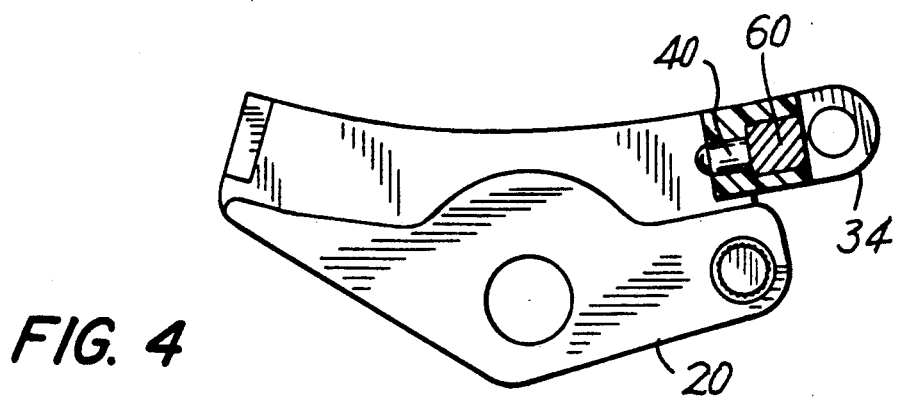
FIG. 4 is a top plan view of a limit stop/latching assembly in a latched position in accordance with the present invention.

As shown in FIG. 4, a magnetic latch 40 is provided which keeps the actuator carriage at its inner diameter crash stop location when the disk drive is not in use. This prevents movement of the heads across the disk during non-operating conditions (such as during shipment) and, thus, prevents the heads and disks from being damaged.

Figure 8:
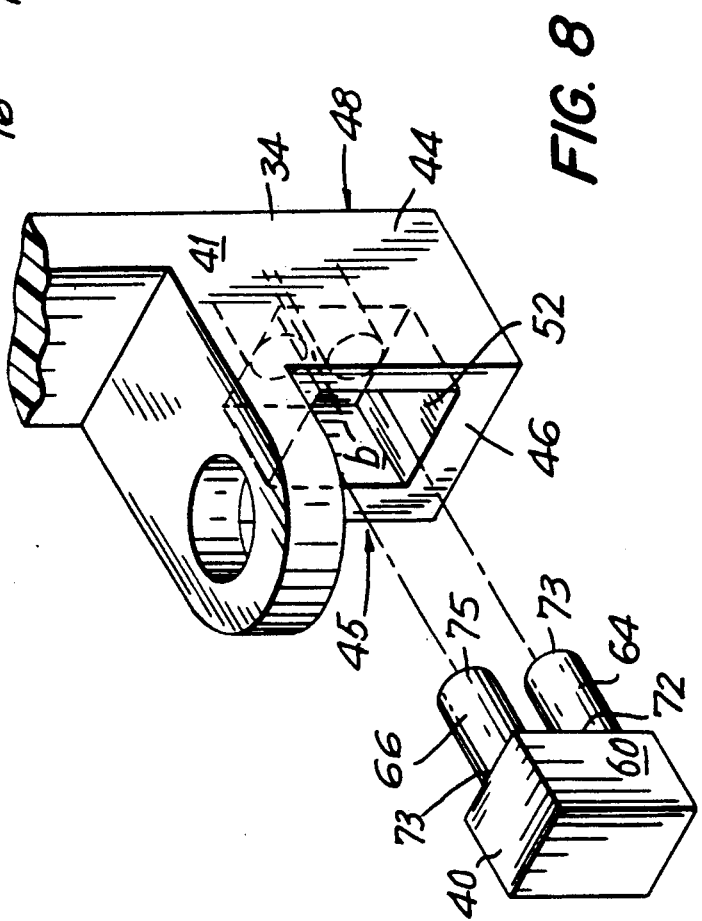
FIG. 8 is a front enlarged perspective view specifically illustrating a preferred embodiment of the present invention wherein the magnetic latch is directly incorporated into the crash stop assembly.
Figure 3:
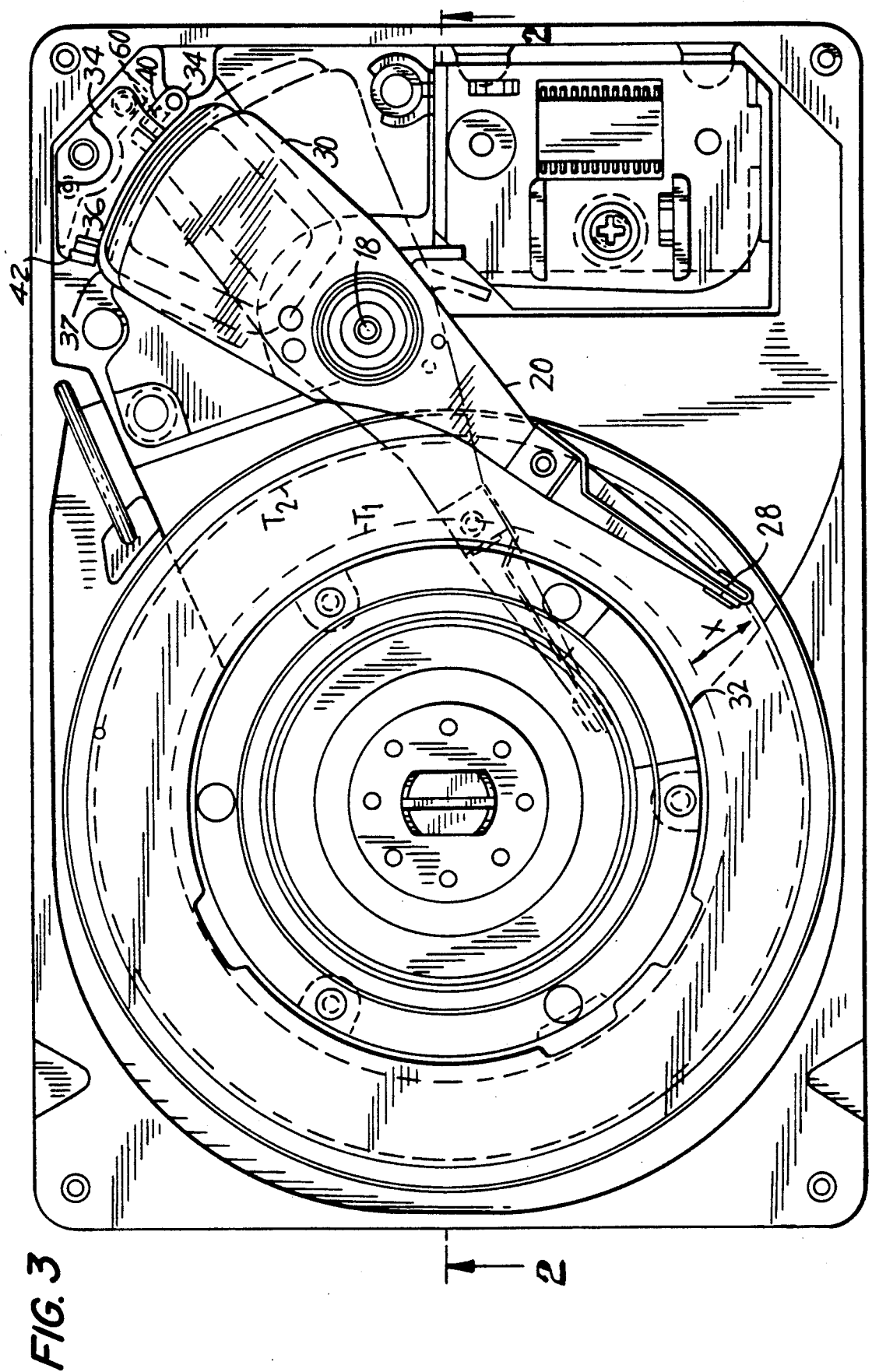
FIG. 3 is a top plan view of the apparatus of FIG. 1 with a top plate of the apparatus removed.
Figure 7:
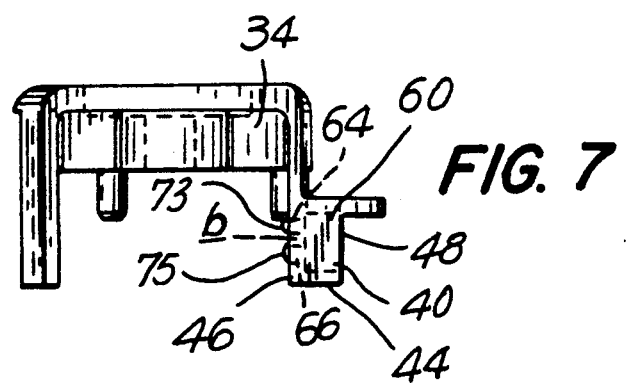
FIG. 7 is an enlarged front elevational view of a preferred embodiment of the carriage latch of this invention.

In FIGS. 3 and 7, the magnetic latch 40 is shown directly incorporated into crash stop assembly 34. The magnetic latch is formed of a plastic mold piece 41 which includes a front face 44, rear face 45, and a pair of side faces 46 and 48. A cavity 52 is formed in mold piece 41 (see FIG. 8). A pair of steel pole pieces 64 and 66 are positioned within the cavity. Each of the pole pieces 64 and 66 has an end 72 and 74, respectively, which abut against magnet 60 and another end 73 and 75 which are freely exposed. As such, magnetic flux can be directed through magnet 60 into the steel pole pieces 64 and 66. In this mold a gap b is formed between steel pole pieces 64 and 66. This gap defines the average cross-sectional area where the application of magnet influence occurs.

Figure 5:
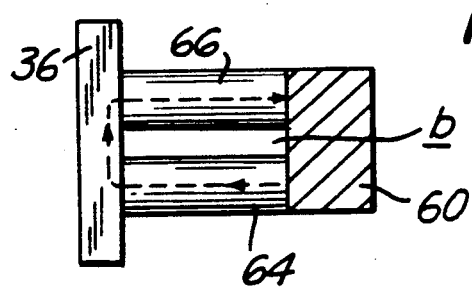
FIG. 5 is an enlarged top plan view of the limit stop/latching assembly of FIG. 4 in a latched position.

In operation, when the actuator rotates to its crash stop position (see FIGS. 4 and 5), steel pole pieces 64 and 66 "magnetically contact" actuator latch plate 36; and magnetic flux flows from magnet 60 through one pole piece, such as 64, then through actuator latch plate 36 and then returns to magnet 60 through the other pole piece 66. Sufficient magnetic attraction between the pole pieces and the crash stop pin serve to latch the actuator to the pin at its inner diameter crash stop position as is illustrated in FIGS. 4 and 5.

Figure 6:
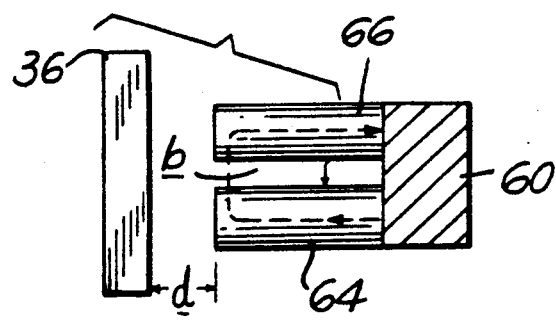
FIG. 6 is an enlarged top plan view of the limit stop/latching assembly of FIG. 4 in a free position.

The magnetic force between pole pieces 64 and 66 and the crash stop pin 34, although sufficient to hold the actuator at its crash stop position, is easily overcome when the actuator is driven during normal operation. In one example, as is shown in FIG. 6, the actuator is of the so-called rotary voice coil motor (VCM) type; and when current flows through the VCM, the actuator pivots with enough force to overcome the magnetic attraction between the pole pieces 64 and 66 and the actuator latch plate 34. When the actuator is pivoted a sufficient distance such that the distance d between the latch assembly 40 and actuator latch plate is greater than the gap b between pole pieces 64 and 66, magnetic flux follows a circuit from magnet 60 through one pole piece 64, across the gap b and then through the other pole piece 66 back to magnet 60. Once the distance from the pole pieces to the actuator latch fin exceeds the gap between the pole pieces, magnetic flux is channeled substantially exclusively through the gap b; and, as a result, there is little, if any, magnetic attraction to the actuator latch fin. The pole pieces thus channel the flux to prevent any interference with normal movement of the actuator that otherwise may result by reason of the magnetic attraction between the crash stop pin and the magnet. Hence, the actuator is driven easily and freely as if the magnetic latch assembly is not even present. As such, this invention provides for the use of a simple magnet and pole pieces, without the addition of any further apparatus, such as a solenoid, spring or other mechanical elements, to function as an actuator latch.

The present invention has been described with respect to a preferred embodiment thereof, but it will be apparent to one of ordinary skill in the art that many changes and modifications may be made therein without departing from the spirit and scope of the present invention, which is to be determined by reference to the appended claims.

What is claimed is:

1. A limit stop/latching assembly in a disk storage system having a movable actuator carriage, said assembly comprising:

crash stop means for limiting travel of said actuator carriage at a fixed stop position and including a crash stop pin and latch means being directly incorporated into said crash stop pin, said latch means having a magnet and a pair of magnetic pole pieces abutting said magnet, said pole pieces being immovable with respect to said crash stop pin;

a latch actuator plate extending from said actuator carriage and movable with said actuator carriage in a path of travel of said actuator carriage to abut said stop position, said latch actuator plate having a magnetically attractive element; and means for moving said actuator carriage between a free position, wherein said latch actuator plate is moved remote from said crash stop means, and a latched position defining said fixed stop position, wherein magnetic flux emanating from said magnet flows through said magnetically attractive element such that said pole pieces are in magnetic contact with said element.

2. The limit stop/latching assembly of claim 1 wherein said actuator latch plate is made of magnetic steel.

3. The limit stop/latching assembly of claim 1 wherein the distance between said pole pieces defines a first gap and the distance between said pole pieces and said magnetically attractive element defines a second gap.

4. The limit stop/latching assembly of claim 3, wherein, in said free position of said actuator carriage, said second gap is greater than said first gap such that magnetic flux is channeled substantially through said first gap to minimize magnetic attraction to said element.

5. The limit stop/latching assembly of claim 3, wherein, in said latched position of said actuator carriage, said first gap is greater than said second gap whereby magnetic flux emanating from said magnet flows through one of said pole pieces, through said latch actuator plate and returns to said magnet through the other of said pole pieces.

6. The limit stop/latching assembly of claim 1 wherein said pole pieces are made of magnetic steel.

7. A limit stop/latching assembly in a disk storage system having a movable actuator carriage, said assembly comprising:
   crash stop means made of non-magnetic material for limiting travel of said actuator carriage at a fixed stop position and including a crash stop pin and latch means being directly incorporated into said crash stop means;
   a magnetic latch actuator plate extending from said actuator carriage and movable with said actuator carriage in a path of travel of said actuator carriage to abut said stop position:
   said latch means having a magnet and a pair of pole pieces made of magnetic steel abutting said magnet, said pole pieces being immovable with respect to said crash stop pin, wherein the distance between said pole pieces defines a first gap and the distance between said pole pieces and said latch actuator plate defines a second gap; and
   means for moving said actuator carriage between a latched position defining said fixed stop position, wherein magnetic flux emanating from said magnet flows through said latch plate such that said pole pieces are in magnetic contact with said latch plate, and a free position, wherein said second gap is greater than said first gap whereby magnetic flux is channeled substantially through said first gap to enable said latch plate to move freely remote from said crash stop means.

8. A limit stop/latching assembly in a disk storage system having a movable actuator carriage, said assembly comprising:
   crash stop means for limiting travel of said actuator carriage at a fixed stop position, and including a crash stop pin and latch means;
   a magnetic latch actuator plate extending from said actuator carriage and movable with said actuator carriage in a path of travel of said actuator carriage to abut said stop position;
   said latch means having a magnet and a pair of magnetic pole pieces immovable with respect to said crash stop pin with each pole piece abutting said magnet, wherein the distance between said pole pieces defines a first gap and the distance between said pole pieces and said latch actuator plate defines a second gap;
   means for moving said actuator carriage between a latched position defining said fixed stop position, wherein said pole pieces are in magnetic contact with said latch actuator plate, and a free position, wherein said second gap is greater than said first gap whereby magnetic flux is channeled substantially through said first gap to enable said latch actuator plate to move freely remote from said crash stop means.

9. The limit stop/latching assembly of claim 8 wherein said latch means is incorporated directly into said crash stop means.

10. The limit stop/latching assembly of claim 8, wherein, in said latched position of said actuator carriage, said first gap is greater than said second gap whereby magnetic flux emanating from said magnet flows through one of said pole pieces, through said actuator latch plate and returns to said magnet through the other of said pole pieces.

11. The limit stop/latching assembly of claim 8 wherein said pole pieces are made of magnetic steel.

12. The limit stop/latching assembly of claim 8 wherein said actuator latch plate is made of magnetic steel.

13. A limit stop/latching assembly in a disk storage system having a movable actuator carriage, said assembly comprising:
   crash stop means for limiting travel of said actuator carriage at a fixed stop position and including a crash stop pin and a pair of magnetic pole pieces abutting a magnet, said pole pieces being immovable with respect to said crash stop pin, wherein the distance between said pole pieces defines a first gap;
   a latch actuator plate extending from said actuator carriage and movable with said actuator carriage in a path of travel of said actuator carriage to abut said stop position, said latch actuator plate having a magnetically attractive element wherein the distance between said pole pieces and said magnetically attractive element defines a second gap; and
   means for moving said actuator carriage between a free position, wherein said latch actuator plate is moved remote from said crash stop means, and a latched position defining said fixed stop position, wherein magnetic flux emanating from said magnet flow through said magnetically attractive element such that said pole pieces are in magnetic contact with said element.

14. The limit stop/latching assembly of claim 13, wherein, in said free position of said actuator carriage, said second gap is greater than said first gap such that magnetic flux is channeled substantially through said first gap to minimize magnetic attraction to said element.

15. The limit stop/latching assembly of claim 13, wherein, in said latched position of said actuator carriage, said first gap is greater than said second gap whereby magnetic flux emanating form said magnet flows through one of said pole pieces, through said latch actuator plate and returns to said magnet through the other of said pole pieces.

* * * * *